United States Patent
Epple et al.

(10) Patent No.: US 11,479,117 B2
(45) Date of Patent: *Oct. 25, 2022

(54) AUXILIARY POWER TAKE-OFF ASSEMBLY

(71) Applicant: ZF Friedrichshafen AG, Friedrichshafen (DE)

(72) Inventors: Michael Epple, Bad Waldsee (DE); Matthias Messmer, Messkirch (DE); Frank Sauter, Meckenbeuren (DE); Sylva Rother, Kressbronn am Bodensee (DE); Mario Holder, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 45 days.

This patent is subject to a terminal disclaimer.

(21) Appl. No.: 17/042,592

(22) PCT Filed: Feb. 27, 2019

(86) PCT No.: PCT/EP2019/054781
§ 371 (c)(1),
(2) Date: Sep. 28, 2020

(87) PCT Pub. No.: WO2019/185264
PCT Pub. Date: Oct. 3, 2019

(65) Prior Publication Data
US 2021/0122238 A1    Apr. 29, 2021

(30) Foreign Application Priority Data
Mar. 29, 2018  (DE) .................... 10 2018 204 909.2

(51) Int. Cl.
*B60K 17/28*    (2006.01)
*B60K 17/22*    (2006.01)
*B60K 25/06*    (2006.01)

(52) U.S. Cl.
CPC .............. *B60K 17/28* (2013.01); *B60K 17/22* (2013.01); *B60K 25/06* (2013.01); *B60K 2025/065* (2013.01)

(58) Field of Classification Search
CPC ........ B60K 17/28; B60K 17/22; B60K 25/06; B60K 2025/065; B60Y 2200/14; B60Y 2300/1888
See application file for complete search history.

(56) References Cited

U.S. PATENT DOCUMENTS

| | | | |
|---|---|---|---|
| 3,406,579 A | 10/1968 | Fisher et al. | |
| 4,191,072 A | 3/1980 | Ehrlinger et al. | |

(Continued)

FOREIGN PATENT DOCUMENTS

| | | |
|---|---|---|
| DE | 1 037 277 | 8/1958 |
| DE | 26 56 669 B1 | 3/1978 |

(Continued)

OTHER PUBLICATIONS

German Search Report Corresponding to 10 2018 204 912.2 dated Feb. 1, 2019.

(Continued)

*Primary Examiner* — Faye M Fleming
(74) *Attorney, Agent, or Firm* — Finch & Maloney PLLC

(57) ABSTRACT

An auxiliary power take-off assembly in a motor vehicle transmission having a torque converter, transmission input and output with a drive shaft on the transmission input. The drive shaft is permanently connected to a drive motor of the vehicle by a pump shaft of the torque converter, a transmission output shaft at the transmission output and a transmission chain having drive input and output elements. A transmission power take-off shaft on the transmission output and a transmission chain having at least a drive element and a power take-off element of which the power take-off element (Continued)

can be connected to an additional unit to be driven, and having a switching element. The power take-off element is arranged on a power take-off shaft and can be connected to the power take-off shaft via the switching element, which is arranged to act between power take-off shaft and the power take-off element.

13 Claims, 1 Drawing Sheet

(56) References Cited

U.S. PATENT DOCUMENTS

| | | | |
|---|---|---|---|
| 4,597,301 | A | 7/1986 | Weis et al. |
| 7,765,884 | B2 | 8/2010 | Frait et al. |
| 9,290,092 | B2 | 3/2016 | Kempf et al. |
| 9,457,659 | B2 | 10/2016 | Kempf et al. |
| 2018/0339586 | A1 | 11/2018 | Trübenbach |
| 2019/0193560 | A1* | 6/2019 | Trübenbach ............ B60K 17/28 |
| 2021/0023943 | A1* | 1/2021 | Epple ...................... F16H 57/02 |
| 2021/0046820 | A1* | 2/2021 | Epple ...................... B60K 25/06 |

FOREIGN PATENT DOCUMENTS

| | | | |
|---|---|---|---|
| DE | 10 2005 055 795 A1 | | 5/2007 |
| DE | 10 2007 059 366 A1 | | 2/2009 |
| DE | 10 2008 033 434 A1 | | 4/2009 |
| DE | 10 2014 107 841 A1 | | 12/2014 |
| DE | 10 2015 121 019 A1 | | 6/2016 |
| DE | 10 2015 223 604 A1 | | 6/2017 |
| DE | 10 2016 212 209 A1 | | 1/2018 |
| EP | 0 677 416 A1 | | 4/1995 |
| GB | 2 153 763 A1 | | 8/1985 |
| KR | 20000066885 A | * | 11/2000 |
| WO | 03/035426 A1 | | 3/2003 |

OTHER PUBLICATIONS

German Search Report Corresponding to 10 2018 204 910.6 dated Feb. 1, 2019.
German Search Report Corresponding to 10 2018 204 909.2 dated Feb. 1, 2019.
International Search Report Corresponding to PCT/EP2019/054780 dated Apr. 12, 2019.
International Search Report Corresponding to PCT/EP2019/054777 dated Apr. 12, 2019.
International Search Report Corresponding to PCT/EP2019/054781 dated Apr. 12, 2019.
Written Opinion Corresponding to PCT/EP2019/054780 dated Apr. 12, 2019.
Written Opinion Corresponding to PCT/EP2019/054777 dated Apr. 12, 2019.

* cited by examiner

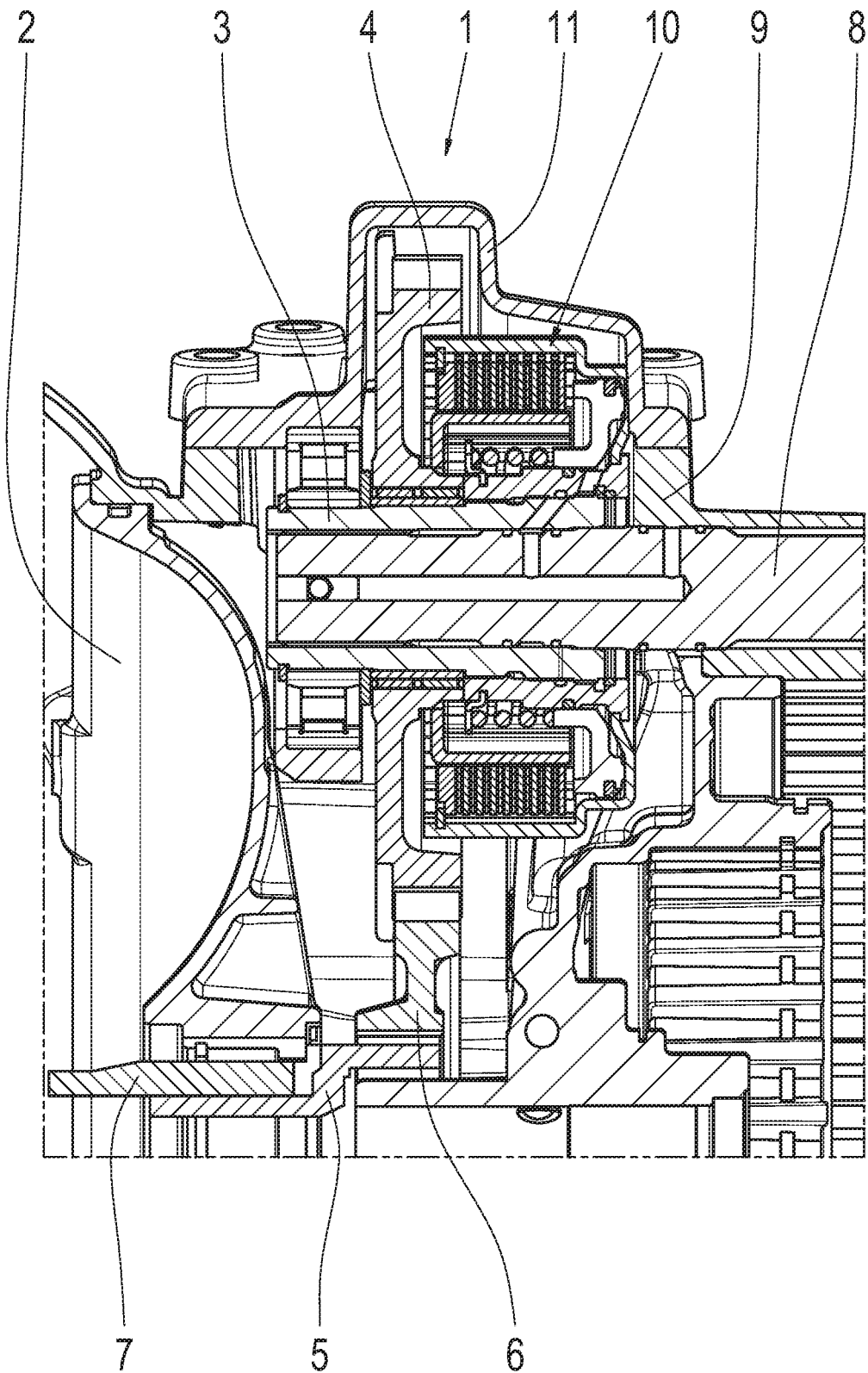

AUXILIARY POWER TAKE-OFF ASSEMBLY

This application is a National Stage completion of PCT/EP2019/054781 filed Feb. 27, 2019, which claims priority from German patent application serial no. 10 2018 204 909.2 filed Mar. 29, 2018.

FIELD OF THE INVENTION

The present invention relates to an auxiliary power take-off assembly and a transmission with an auxiliary power take-off assembly.

BACKGROUND OF THE INVENTION

Vehicle transmissions in utility vehicles often comprise an auxiliary power take-off assembly by means of which various types of auxiliary aggregates in the vehicle can be driven. This applies in equal measure to transmissions with a friction disk clutch and a vehicle transmission equipped with a torque converter.

Auxiliary power take-off assemblies are used in particular in buses, trucks, construction machinery, agricultural vehicles or special vehicles.

Auxiliary power take-off assemblies are available in drive-dependent, clutch-dependent or motor-dependent versions. Drive-dependent auxiliary power take-off assemblies, for example, supply the hydraulic system of dual-circuit steering systems with a working pressure, whereby rolling vehicles can still be steered if the primary system has failed due to a motor breakdown. Clutch-dependent auxiliary power take-offs are suitable for short- or long-term operation during driving or at rest. Motor-dependent auxiliary power take-offs differ from clutch-dependent auxiliary power take-offs in that in motor-dependent auxiliary power take-offs there is a direct connection to the crankshaft of the drive motor, which bypasses the vehicle clutch or torque converter, so that such auxiliary power take-offs are mechanically permanently connected with the crankshaft of the drive motor. They are designed for high constant power in long-term operation and can be loaded with the maximum motor torque. They can be operated while the vehicle is driving or at rest, and can be engaged or disengaged under load. Motor-dependent auxiliary power take-offs are arranged between the motor and the transmission, they are driven always directly by the motor by way of a separate clutch, and can also be engaged and disengaged under load while the vehicle is driving or at rest.

From DE 10 2016 212 209 A1 an auxiliary power take-off assembly for a motor vehicle transmission with a torque converter is known, which has a driveshaft permanently connected to a drive motor of the motor vehicle by way of the pump shaft of the torque converter. Furthermore, the auxiliary power take-off assembly comprises a transmission chain with a drive input element, an intermediate wheel and a drive output element, whose drive output element is connected to an auxiliary aggregate that is to be driven, and a shifting element. The shifting element is arranged for the optional connection of the driveshaft to drive input element, and acts between the driveshaft and the drive input element of the transmission chain. In that way the auxiliary power take-off assembly can already be decoupled, behind the driveshaft connected to the pump shaft of the torque converter, completely from the rest of the transmission chain and the auxiliary aggregate, so that when not needed these elements do not have to co-rotate and do not therefore produce any losses and noise. The shifting element is permanently fitted in the transmission.

From the document DE 10 2015 121 019 A1 a transmission is known, which comprises a housing, an input shaft, a transmission shaft, a first and a second transmission element, a contiguous transmission element, a driveshaft and a torque-transmitting mechanism. The input shaft and the transmission shaft are in each case mounted rotatably in the housing and are parallel to one another. The first transmission element is connected to the input shaft so that they rotate together. The second transmission element is connected to the transmission shaft so that they rotate together. The contiguous transmission element engages with each of the first and second transmission elements. A second output shaft is arranged coaxially with the transmission shaft and is partially covered by the latter. The torque transmitting mechanism connects the transmission shaft selectively to the driveshaft. Thus, on the axis of the transmission shaft the invention comprises two separate shafts, the transmission shaft (driven shaft) and the second output shaft, wherein a separator clutch is arranged coaxially with the driven shaft and the second output shaft, and the driven shaft and the driven sprocket wheel are connected selectively thereby to the second output shaft. Thus, the driven shaft itself cannot be decoupled.

SUMMARY OF THE INVENTION

The purpose of the present invention is to improve and simplify the structure known from the prior art, and to minimize the installation effort. It should also be possible to retrofit the solution in an existing system.

This objective is achieved by an auxiliary power take-off assembly and a transmission with the characteristics specified in the independent claims. Design features are the subject of the subordinate claims.

An auxiliary power take-off assembly in a transmission of a motor vehicle is provided, the transmission having a torque converter, a transmission input and a transmission output, with a driveshaft permanently connected to a drive motor of the motor vehicle via the pump shaft of the torque converter at the transmission input, a transmission output shaft at the transmission output, and a transmission chain consisting at least of a drive input element and a drive output element, whose drive output element can be connected to an auxiliary aggregate to be driven, and with a shifting element, wherein the drive output element is arranged on a drive output shaft and by means of the shifting element, which is arranged and acts between the drive output shaft and the drive input element of the transmission chain, can be connected to the drive output shaft. In this case, the shifting element is integrated into the transmission housing in such manner that it can be retrofitted. Since the auxiliary power take-off assembly is accommodated inside the transmission housing under a housing cover, easier access to the components is possible. The housing cover forms part of the transmission housing. It is fixed detachably to the transmission housing and closes an opening in the transmission housing. The housing cover is preferably bolted to the transmission housing. The shifting element is located in the area of the drive output shaft and the drive output element, since it can connect those two components to one another and thus under the housing cover, whereby the installation and removal of the components is made possible or facilitated.

The transmission input is on the driven side of the transmission, where a drive unit passes torque into the transmission by way of an input shaft. The transmission output is on the drive output side, i.e. on that side of the transmission where a transmission output shaft transmits torque to a drive output shaft or a differential by means of which the wheels of the vehicle are driven. Thus, the transmission input is opposite the transmission output.

The driveshaft and the drive output shaft are preferably arranged with their axes parallel to one another. The intermediate shaft is arranged coaxially with the drive output shaft. The drive input element and the drive output element can be in the form of gearwheels, which engage directly in one another without an intermediate wheel. A further transmission element could also be interposed between the drive input element and the drive output element.

Auxiliary aggregates can be attached directly on the side of the transmission housing, or the drive output shaft can be extended by means of an intermediate shaft to the transmission output, so that auxiliary aggregates for connection can be arranged at the transmission output. The intermediate shaft can in that case be mounted in the drive output shaft. On the transmission output side, the intermediate shaft can have a driving profile which can receive a driveshaft or a drive output flange of an auxiliary aggregate. The driving profile can also be designed to receive a driveshaft or drive output flange of a hydraulic pump, or to receive a driveshaft of a step-up stage. The intermediate shaft is preferably at least partially surrounded by a protective tube.

The auxiliary power take-off assembly is part of a transmission.

BRIEF DESCRIPTION OF THE DRAWINGS

The invention will be explained in greater detail with reference to a sole FIGURE.

The sole FIGURE shows a cross section of a transmission with an auxiliary power take-off assembly according to the invention.

DETAILED DESCRIPTION OF THE PREFERRED EMBODIMENTS

The sole FIGURE shows the auxiliary power take-off assembly according to the invention, which is arranged at the transmission input downstream from a torque converter 2. The torque converter 2 is fitted in such manner that its pump wheel is driven by a drive unit and is permanently connected to the pump shaft 7. The driveshaft 5 of the auxiliary power take-off assembly 1 is connected to the pump shaft 7. The drive input element 6 of the auxiliary power take-off assembly 1 is fitted on the driveshaft 5 of the auxiliary power take-off assembly 1. In this case the drive input element 6 is not coupled shiftably to the driveshaft 5, and transmits torque directly to a drive output element 4 mounted on a drive output shaft 3. In this example an additional transmission member in the transmission chain is dispensed with, in order to minimize the number of components. However, an intermediate element for transmitting torque between the drive input element 6 and the drive output element 4 could also be interposed. The drive output element 4 can be coupled to or decoupled from the drive output shaft 3 by the shifting element 10. In the decoupled condition the drive output shaft 3 and any further components connected to that element, and also any auxiliary aggregate connected to the auxiliary power take-off assembly 1, are no longer driven. This reduces noise and power losses during driving operation.

In this case an intermediate shaft 8 is fitted in the drive output shaft 3, which intermediate shaft passes the torque on from the drive output shaft 3 to the transmission output, where a corresponding auxiliary aggregate or end consumer can be connected and thereby can be driven. By virtue of the guiding to the transmission output auxiliary aggregates can be connected to the transmission output as in the case of classical external auxiliary power take-offs. The intermediate shaft 8 is preferably surrounded by a protective tube and is fitted in the drive output shaft 3 on the transmission input side or on the drive output shaft 5 side. To drive an auxiliary aggregate, the intermediate shaft 8 can have on its transmission output side a driving profile. The driving profile can receive a driveshaft or a drive output flange of an auxiliary aggregate, and drive it. This can be, for example, a driveshaft of a hydraulic pump or a drive output flange. The driving profile of the intermediate shaft can also be provided to receive a driveshaft of a step-up stage. The protective tube of the intermediate shaft 8 is preferably mounted on the transmission input side and the transmission output side in the transmission.

The drive output shaft 3 is preferably mounted in the bearing cap 11, which has two moldings or projections that extend into the transmission, in which projections bores for mounting the drive output shaft 3 are provided. In the bores, various types of bearings can be provided, for example conical roller bearings which hold the drive output shaft 3. The bearing cap 11 closes an opening in the transmission housing 9, for which purpose it can be bolted to the transmission housing 9.

The auxiliary power take-off assembly 1 is part of the transmission, since the drive input wheel 6, the drive output wheel 4, the shifting element 10 and the drive output shaft 3 are arranged inside the transmission housing 9, so that no additional PTO is needed for driving auxiliary aggregates.

INDEXES

1 Auxiliary power take-off assembly
2 Torque converter
3 Drive output shaft
4 Drive output element
5 Driveshaft
6 Drive input element
7 Pump wheel
8 Intermediate shaft
9 Transmission housing
10 Shifting element
11 Housing cover

The invention claimed is:

1. An auxiliary power take-off assembly of a transmission of a motor vehicle having a torque converter, with a transmission input and a transmission output with a driveshaft at the transmission input, the driveshaft being permanently connected to a drive motor of the motor vehicle by way of a pump shaft of the torque converter, a transmission output shaft at the transmission output and a transmission chain comprising at least a drive input element and a drive output element, the drive output element being connectable to an auxiliary aggregate to be driven, the drive output element, with a shifting element, being arranged on a drive output shaft and being connectable to the drive output shaft by the shifting element, which is arranged and acts between the drive output shaft and the drive output element of the transmission chain.

2. The auxiliary power take-off assembly according to claim 1, wherein the drive input element and the drive output element are formed as gearwheels, which directly engage with one another without any intermediate wheel.

3. The auxiliary power take-off assembly according to claim 1, wherein the drive output shaft is extended by an intermediate shaft to the transmission output so that the auxiliary aggregate to be connected is arrangeable at the transmission output.

4. The auxiliary power take-off assembly according to claim 3, wherein the intermediate shaft is mounted in the drive output shaft.

5. The auxiliary power take-off assembly according to claim 3, wherein the intermediate shaft has a driving profile on a transmission output side.

6. The auxiliary power take-off assembly according to claim 5, wherein the driving profile receives either a driveshaft or a drive output flange of the auxiliary aggregate.

7. The auxiliary power take-off assembly according to claim 6, wherein the driving profile of the intermediate shaft receives a driveshaft of either a hydraulic pump or the drive output flange.

8. The auxiliary power take-off assembly according to claim 5, wherein the driving profile of the intermediate shaft is designed to receive a driveshaft of a step-up stage.

9. The auxiliary power take-off assembly according to claim 3, wherein the intermediate shaft is at least surrounded partially by a protective tube.

10. The auxiliary power take-off assembly according to claim 1, wherein the shifting element can be retrofitted.

11. The auxiliary power take-off assembly according to claim 1, wherein the auxiliary power take-off assembly is accommodated inside a transmission housing under a housing cover.

12. A transmission with an auxiliary power take-off assembly according to claim 1.

13. An auxiliary power take-off assembly of a motor vehicle transmission having a torque converter, a transmission input, a transmission output, and a driveshaft located at the transmission input;
    the driveshaft being permanently connected to a drive motor of a motor vehicle by way of a pump shaft of the torque converter, and being permanently connected to a drive input element and a drive output element of a transmission chain,
    the driveshaft being connectable to a transmission output shaft at the transmission output; and
    the drive output element being mounted on a drive output shaft of the transmission chain such that the drive output element being rotatable relative to the drive output shaft,
    the drive output element being fixedly connectable, via a shifting element, to an auxiliary aggregate to be driven, and
    the shifting element being arranged and acts between the drive output shaft and the drive output element of the transmission chain.

* * * * *